United States Patent
Chavez et al.

(10) Patent No.: US 7,414,980 B1
(45) Date of Patent: Aug. 19, 2008

(54) INTERFERENCE ESTIMATION FOR INTERFERENCE EXCISION WITH LOW COMPUTATIONAL COMPLEXITY

(75) Inventors: Carlos J. Chavez, Marion, IA (US); Robert J. Frank, Cedar Rapids, IA (US); Erik M. Sjolander, Gainesville, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 559 days.

(21) Appl. No.: 11/098,757

(22) Filed: Apr. 4, 2005

(51) Int. Cl.
*H04L 12/26* (2006.01)

(52) U.S. Cl. .................. 370/241; 455/296; 375/346; 375/132

(58) Field of Classification Search ........... 370/241, 370/329, 330; 375/316, 346, 132
See application file for complete search history.

(56) References Cited

U.S. PATENT DOCUMENTS

| 6,498,820 B1* | 12/2002 | Thomson et al. ............ 375/346 |
| 7,292,617 B2* | 11/2007 | Beasley et al. ............. 375/132 |
| 2005/0013386 A1* | 1/2005 | Ojard .................... 375/316 |

* cited by examiner

*Primary Examiner*—Chi H. Pham
*Assistant Examiner*—Albert T Chou
(74) *Attorney, Agent, or Firm*—Nathan O. Jensen

(57) ABSTRACT

The present invention is a method and system for estimating interference. Packet characteristics of relevant packets within the channel at a given point in time may be processed. For example, a power level, occupied frequency and corresponding time references may be accumulated and stored for each relevant packet within the channel at a given point in time. As each packet is processed for demodulation, the channel samples, at which interference occurred, may be appropriately weighted based on the packet characteristics. Advantageously, the nature of the interfering channel traffic may be measured to properly de-weight the interference in a computationally efficient manner.

11 Claims, 5 Drawing Sheets

| Packet | Time | Frequency | Power | Azimuth | Range | Elevation | Polarization |
|---|---|---|---|---|---|---|---|
| 1 | | | | | | | |
| 2 | | | | | | | |
| 3 | | | | | | | |
| 4 | | | | | | | |

US 7,414,980 B1

INTERFERENCE ESTIMATION FOR INTERFERENCE EXCISION WITH LOW COMPUTATIONAL COMPLEXITY

STATEMENT REGARDING FEDERALLY SPONSORED RESEARCH

The present invention has been developed as a result of an expenditure of Federal funds under development for the Defense Advanced Research Projects Agency (DARPA) and the Air Force Research Laboratory, Government Contract F33615-01-C-1856. The inventors are not obligated to assign the application to the Federal Government of the United States nor any of its offices and agencies.

FIELD OF THE INVENTION

This invention relates generally to wireless communication systems and more particularly to a method and system for improved interference estimation in a wireless communication system.

BACKGROUND OF THE INVENTION

Wireless communication systems have been developed to provide communication links between multiple mobile parties. Many wireless communication systems operate according to a channel model with multiple messages being transmitted across the communication system simultaneously. With multiple messages passed across a communication system, collisions between messages occur which creates interference.

Interference may prevent the recovery of data from a transmitted packet. Consequently, frequency hopping and the use of coding techniques in conjunction with weighting algorithms for responses to non-stationary channel conditions may be employed. Frequency hopping reduces the effects of interference by spreading a transmission over multiple center frequencies. Coding techniques, such as forward error correction, allows recovery of lost channel bits and improves the robustness of data transmission.

In order to further improve data reception, interference is de-weighted. The conventional technique for de-weighting interference is limited due to the failure to account for the nature of the interfering channel traffic. Packets being transmitted across a channel simultaneous with a packet for reception create interference. Consequently, an improved interference processing technique which accounts for the interfering channel traffic is necessary.

SUMMARY OF THE INVENTION

Accordingly, the present invention is directed to a method and system for estimating interference. In an embodiment of the invention, packet characteristics of relevant packets within the channel at a given point in time may be processed. For example, a power level, occupied frequency and corresponding time references may be accumulated and stored for each packet within the channel at a given point in time. As each packet is processed for demodulation, the channel samples at which interference occurred may be appropriately weighted based on the packet characteristics. Advantageously, the nature of the interfering channel traffic may be measured to properly de-weight the interference in a computationally efficient manner.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

Those numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
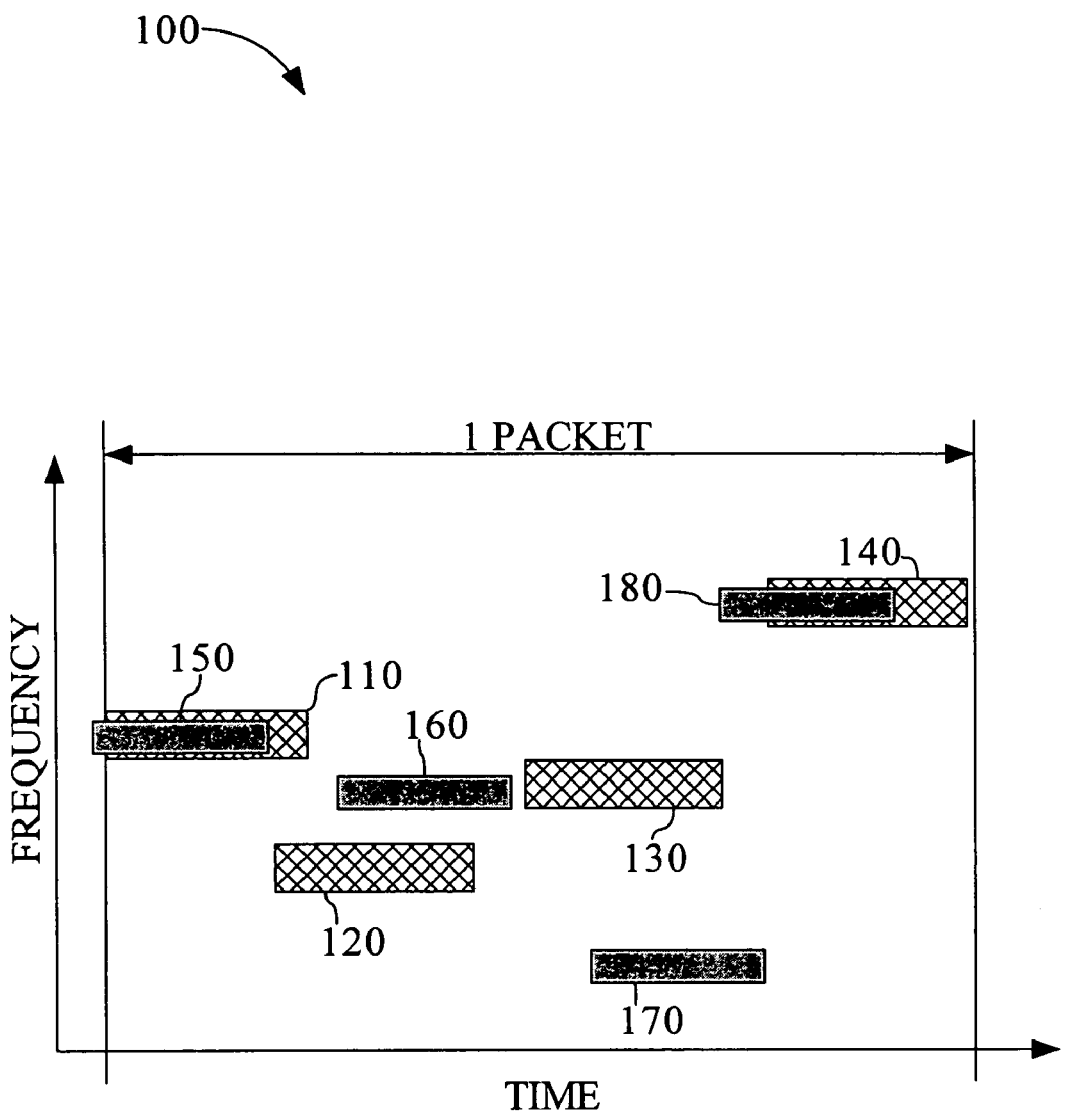
FIG. 1 depicts a channel environment of a wireless communication system in accordance with an embodiment of the present invention.

Referring to FIG. 1, a channel environment 100 of a wireless communication system in accordance with an embodiment of the present invention is shown. The channel environment may be representative of a collision-based frequency hopping system. A packet composed of four dwells on four frequencies 110-140 may be shown with one interfering signal 150-180 is shown for exemplary purposes. Collided dwells 110, 140, dwells in which an interfering signal 150, 180 overlap, may have substantial interference. Conventional systems for estimation of interference fail to precisely account for the interference created at the collided dwells 110, 140 which limits the ability to recover data from the dwells 110, 140. The method and system of the present invention may allow precise de-weighting of interference at the collided dwells 110, 140.

Figure 2:
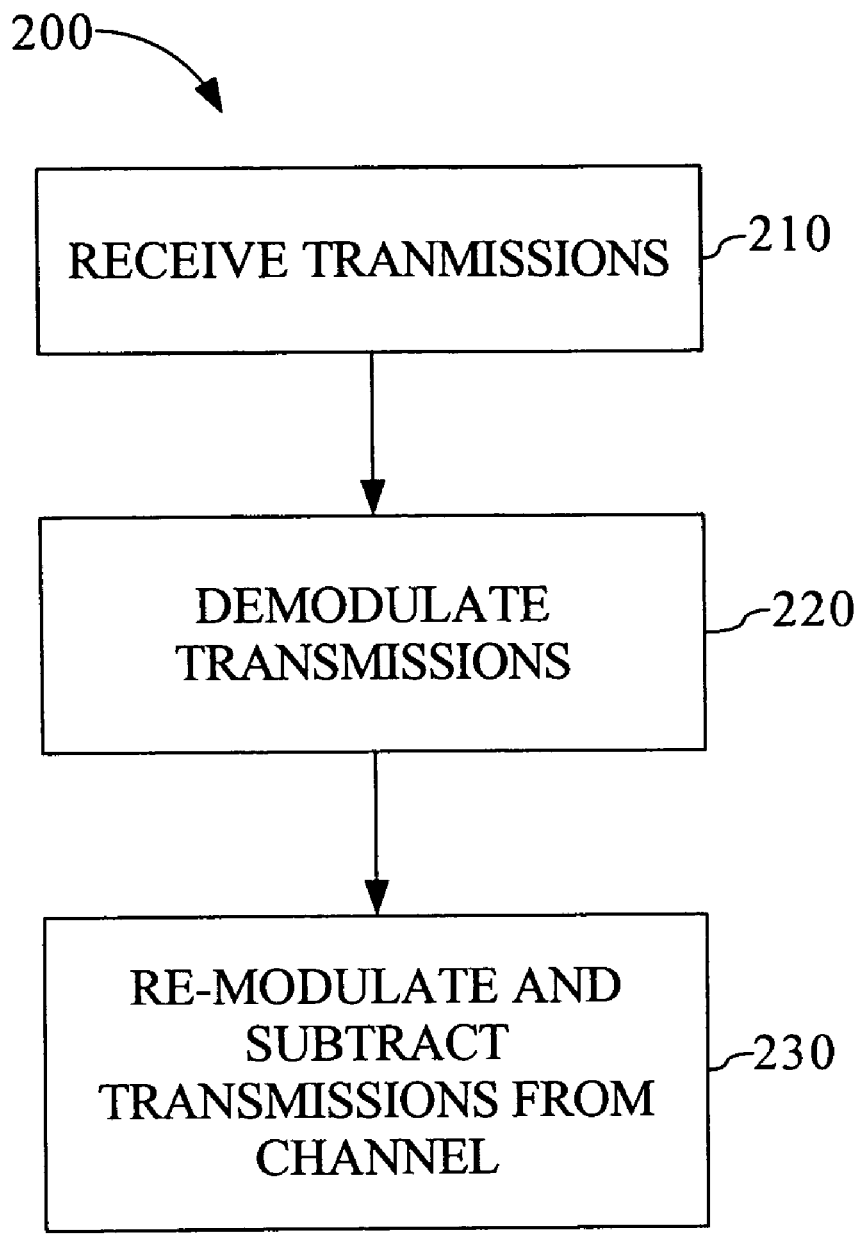
FIG. 2 depicts a flow chart of a method for iterative interference estimation in accordance with an embodiment of the present invention.

Referring to FIG. 2, a flow chart of a method 200 for iterative interference estimation in accordance with the present invention is shown. Method 200 may operate to subtract interfering signal portions 150, 180 to allow better data reception of dwells 110, 140 of FIG. 1. A time, phase and amplitude estimation of the interfering signal provides interference excision. Method 200 may begin by receiving transmissions (both interfering signals and desired signals) present within a channel 210. The transmissions may be demodulated 220. After demodulation, the transmission may be re-modulated and subtracted from the channel 230. This may create increased signal to noise ratios for low power signals present within a channel, for example, the low power signals degraded by collisions.

Figure 3:
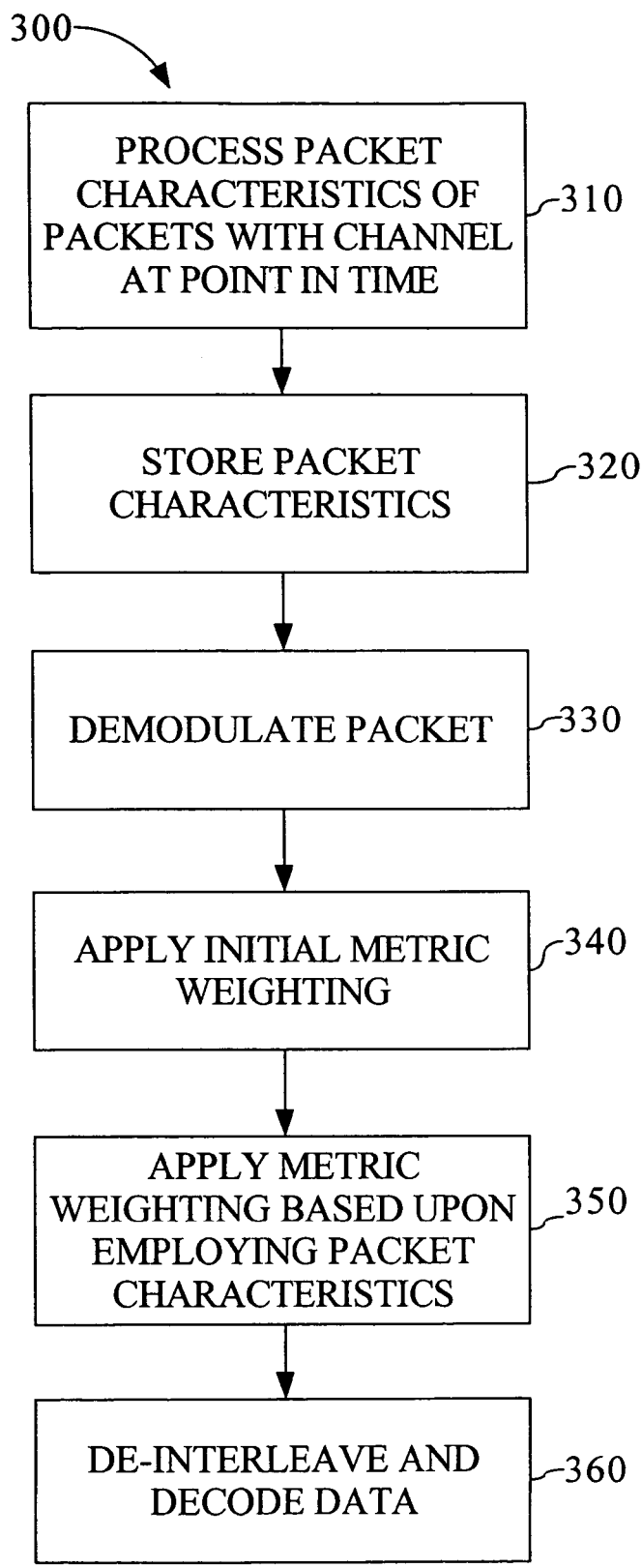
FIG. 3 depicts a flow chart of a method for de-weighting interference in accordance with an embodiment of the present invention.

Referring to FIG. 3, a flow chart of a method 300 for de-weighting interference in accordance with an embodiment of the present invention is shown. Method 300 may achieve precise time alignment with respect to the application of de-weighting of interference along with derivation of accurate metric values. Method 300 may being by processing packet characteristics of packets within a channel at a point in time 310. Processed packets may include all desired packets and all interfering packets within the channel, or may include a subset of desired packets and a subset of interfering packets. Examples of packet characteristics may include references of time, frequency, power, azimuth, elevation range and polarization. The packet characteristics may be stored 320. It is contemplated that packet characteristics may be obtained from existing receiver processing of demodulation systems. For example, receiver processing may provide delay estimation, Doppler estimation and phase estimation from which packet characteristics may be derived. Packets may be received serially and a packet may be demodulated 330. Upon demodulation, an initial set of metrics may be applied 340. This may provide an estimation of the desired signal strength for each dwell and a power-based estimation of the level of interference present on each dwell. Additional metric weighting may be performed by applying the stored packet characteristic information 350. The channel samples at which interference occurred are appropriately weighted based upon the packet characteristic data. De-interleaving and decoding may be performed to recover the data 360.

Advantageously, method 300 of the present invention may allow de-weighting of interference to enhance recovery of data. For example, dwells 110, 140 of FIG. 1 which have interfering signal may be de-weighted to allow recovery of the data associated with dwells 110, 140. In an embodiment of the invention, the time and frequency position of collisions may be effectively identified along with a power level to effectively de-weight the interference. Application of metric weighting from the packet characteristics may account for the nature of the interfering traffic.

Another advantageous aspect of method 300 for de-weighting interference is the low computational complexity associated with implementing the method 300. Method 200 for de-weighting interference may require prohibitive processing power when a signal stream is maintained in real-time. Re-modulation and subtraction of interfering signals may be memory and computationally intensive. Method 300 may not require the processing capacity and memory capacity necessary for re-modulation and subtraction of interfering signals. Minimal memory storage may be required for storage of the packet characteristics and minimal processing capacity may be necessary for application of metric weighting based upon the packet characteristics.

Figure 4:
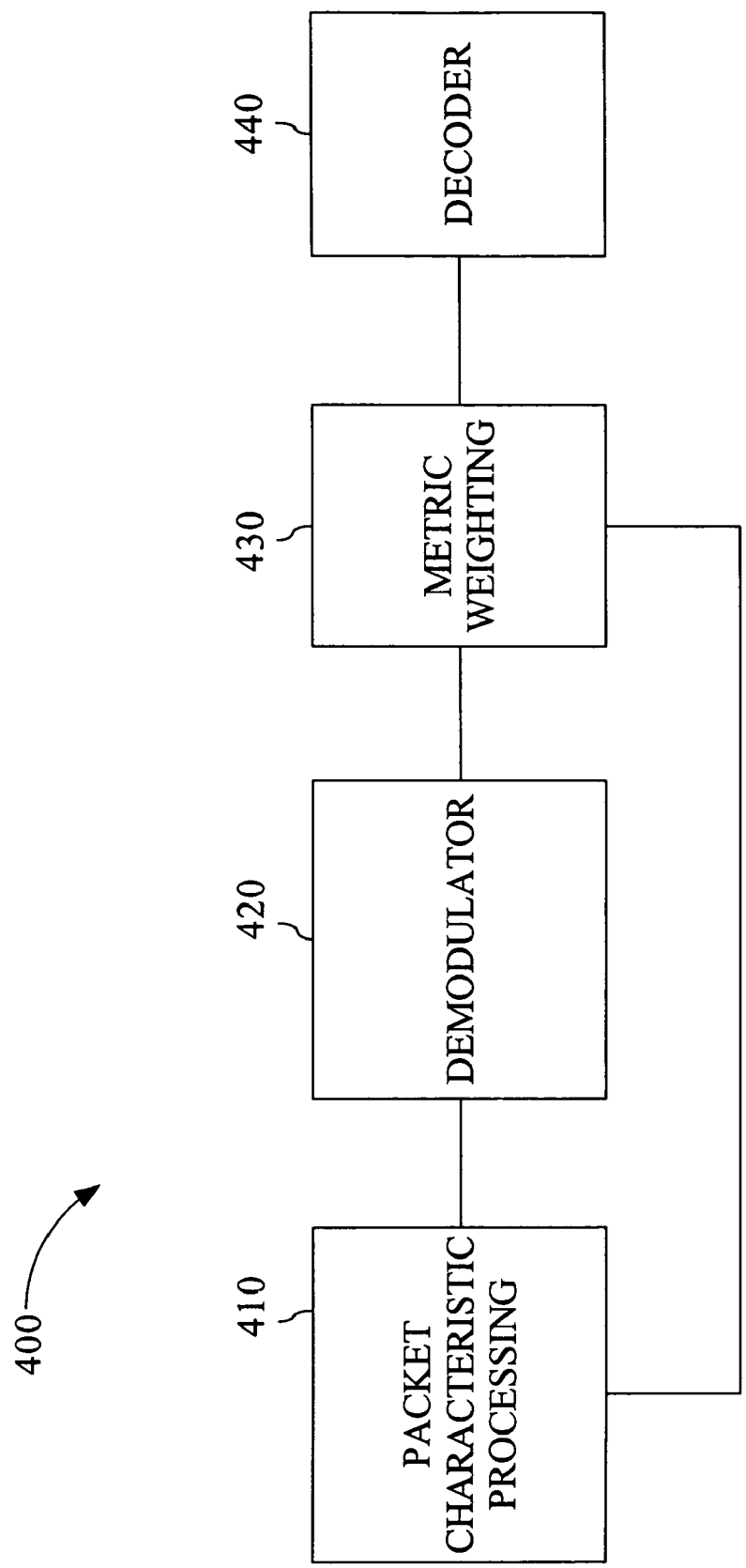
FIG. 4 depicts a block diagram of a system for de-weighting interference in accordance with an embodiment of the present invention.

Referring to FIG. 4, a block diagram of a system 400 for de-weighting interference in accordance with an embodiment of the present invention is shown. System 400 may include packet characteristic processing 410, demodulator 420, metric weighting 430 and a decoder 440. Packet characteristic processing 410 may receive packets within a channel and may extract packet characteristics of packets within the channel. Packet characteristic processing 410 may also store the packet characteristics. Demodulator 420 may receive packets for reception and demodulate the packet. Metric weighting 430 may perform initial metric weighting to obtain an estimation of the desired signal strength for each dwell and a power-based estimation of the level of interference present on each dwell. Metric weighting 430 may also apply packet characteristics via the packet characteristic processing 410 whereby the channel samples at which interference occurred are appropriately weighted based upon the packet characteristic data. Decoder 440 may be a forward error correction decoder which may allow recovery of lost channel bits and improves the robustness of data transmission.

In an advantageous aspect of the present invention, system 400 may operate to perform method 300 for de-weighting interference in accordance with an embodiment of the present invention. It is further contemplated that packet characteristic processing may be obtained using existing receiver processing such as delay estimation, Doppler estimation and phase estimation. It is contemplated that the storage and application of metric weighting based upon the packet characteristic data may be implemented by execution of a program of instructions, or software and the like.

Figure 5:
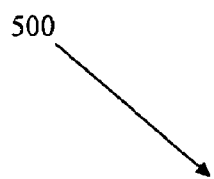
FIG. 5 depicts a packet characteristic table in accordance with an embodiment of the present invention.

Referring to FIG. 5, a packet characteristic table 500 in accordance with an embodiment of the present invention is shown. When packet characteristic information is stored, it may be stored within a database with a visual appearance such as the packet characteristic table 500. Packet characteristic table 500 may list known symbol information for a plurality of packets in a channel at a given point of time. Packet characteristic data may include references for time, frequency, power, azimuth, elevation, range and polarization.

It is contemplated that channel environment 200 of FIG. 2 may be representative of Tactical Targeting Network Technology (TTNT). TTNT is a high throughput low-latency solution for addressing sensor to shooter links. TTNT is an Internet Protocol (IP) based high-speed dynamic ad hoc network designed to quickly target moving and time-critical targets. As TTNT is capable of supporting more than two hundred (200) users and transmission of multiple receive streams simultaneously, the de-weighting of interfering channel traffic in accordance with the present invention may be advantageous.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for receiving a packet in a wireless communication system, comprising:
    receiving subsets of at least one desired packet and subsets of at least one interference packet of a channel;
    processing at least one packet characteristic of said subsets of at least one desired packet and said subsets of at least one interference packet of a channel, said at least one packet characteristic including a time reference, a frequency reference and a power reference;
    determining a signal strength of each subset of said at least one desired packet;
    determining a power-based level of interference at each subset of said at least one desired packet;
    storing said at least one packet characteristic;
    demodulating a packet for reception; and
    applying metric weighting to a subset of at least one desired packet in which a subset of at least one interference packet is present based upon said time reference and frequency reference of said subset of at least one desired packet and said subset of at least one interference packet, said metric weighting based upon said at least one packet characteristic, wherein said metric weighting de-weights interference at said subset of at least one desired packet.

2. The method as claimed in claim 1, wherein processing of at least one packet characteristic includes extracting said at least one packet characteristic from each packet.

3. The method as claimed in claim 1, wherein said at least one packet characteristic of each packet is stored within a table.

4. The method as claimed din claim 1, wherein said at least one packet characteristic further includes an azimuth reference, an elevation reference, a range reference and a polarization reference.

5. A system for receiving a packet in a wireless communication system, comprising:
- means for receiving subsets of at least one desired packet and subsets of at least one interference packet of a channel;
- means for processing of at least one packet characteristic of said subsets of at least one desired packet and said subsets of at least one interference packet of a channel, said at least one packet characteristic including a time reference, a frequency reference, power reference, azimuth reference, an elevation reference, a range reference, and a polarization reference;
- means for determining a signal strength of each subset of said at least one desired packet;
- means for determining a power-based level of interference at each subset of said at least one desired packet;
- means for storing said at least one packet characteristic;
- means for demodulating a packet for reception; and
- means for applying metric weighting to a subset of at least one desired packet in which a subset of at least one interference packet is present based upon said time reference and frequency reference of said subset of at least one desired packet and said subset of at least one interference packet, said metric weighting based upon said at least one packet characteristic, wherein said metric weighting de-weights interference at said subset of at least one desired packet.

6. The system as claimed in claim 5, wherein means for processing of at least one packet characteristic includes extracting said at least one packet characteristic from each packet.

7. The system as claimed in claim 5, wherein said at least one packet characteristic of each packet is stored within a table.

8. The system as claimed in claim 5, wherein said at least one packet characteristic is derived from delay estimation, Doppler estimation and phase estimation.

9. A method for receiving a packet in a wireless communication system, comprising:
- receiving subsets of at least one desired packet and subsets of at least one interference packet of a channel;
- processing at least one packet characteristics of said subsets of at least one desired packet and said subsets of at least one interference packet of a channel, said at least one packet characteristic including a time reference, a frequency reference and a power reference azimuth reference, an elevation reference, a range reference and a polarization reference, said at least one packet characteristic is derived from delay estimation, Doppler estimation and phase estimation;
- determining a signal strength of each subset of said at least one desired packet;
- determining a power-based level of interference at each subset of said at least one desired packet;
- storing said at least one packet characteristic;
- demodulating a packet for reception;
- applying metric weighting to a subset of at least one desired packet in which a subset of at least one interference packet is present based upon said time reference and frequency reference of said subset of at least one desired packet and said subset of at least one interference packet
- said metric weighting based upon said at least one packet characteristic, wherein said metric weighting de-weights interference at said subset of at least one desired packet.

10. The method as claimed in claim 9, wherein processing of at least one packet characteristic includes extracting said at least one packet characteristic from each packet.

11. The method as claimed in claim 9, wherein said at least one packet characteristic of each packet is stored within a table.

* * * * *